United States Patent [19]
Larsen

[11] Patent Number: 5,493,956
[45] Date of Patent: Feb. 27, 1996

[54] TANK APPARATUS WITH MOVABLE ROLLERS

[75] Inventor: Hans K. Larsen, Aestorp, Sweden

[73] Assignee: Nestec S.A, Vevey, Switzerland

[21] Appl. No.: 239,935

[22] Filed: May 9, 1994

Related U.S. Application Data

[60] Continuation of Ser. No. 848,218, Mar. 10, 1992, abandoned, which is a division of Ser. No. 596,679, Oct. 12, 1990, Pat. No. 5,096,729.

[30] Foreign Application Priority Data

Nov. 18, 1989 [EP] European Pat. Off. .............. 89121378

[51] Int. Cl.⁶ .................................................. A47J 37/12
[52] U.S. Cl. ................... 99/404; 99/360; 99/407; 426/509; 68/175; 198/575
[58] Field of Search ............................ 99/404, 405, 406, 99/407, 386, 373, 360, 423; 68/175, 158; 198/524, 535, 572, 575, 585, 601, 782, 787, 620

[56] References Cited

U.S. PATENT DOCUMENTS

| | | | |
|---|---|---|---|
| 1,932,105 | 10/1933 | Hinnekens | 68/175 |
| 2,118,856 | 5/1938 | Moncrieff et al. | 68/175 |
| 2,595,356 | 5/1952 | Hansen et al. | 198/575 |
| 2,905,105 | 9/1959 | Lombi . | |
| 2,979,933 | 4/1961 | Gaino | 68/175 |
| 3,460,978 | 8/1969 | Clayton et al. | 68/175 |
| 3,520,248 | 7/1970 | MacKendrick | 99/404 |
| 3,602,125 | 8/1971 | Hersh | 68/175 |
| 3,937,838 | 2/1976 | Campbell et al. | 99/407 |
| 4,506,526 | 3/1985 | Kutz et al. | 68/175 |
| 4,522,217 | 6/1985 | D'Alterio . | |
| 4,594,941 | 6/1986 | Anderson | 99/407 |
| 4,752,491 | 6/1988 | D'Alterio et al. . | |

*Primary Examiner*—David Scherbel
*Assistant Examiner*—James F. Hook
*Attorney, Agent, or Firm*—Vogt & O'Donnell

[57] ABSTRACT

A tank apparatus has at least one set of three rollers suitable for being positioned therein, one roller of each set having a density less than a density of water so that the roller is floatable in water, and the two other rollers being movable rollers capable of reciprocating vertically from a position above to a position below the floatable roller.

9 Claims, 7 Drawing Sheets

TANK APPARATUS WITH MOVABLE ROLLERS

CROSS REFERENCE TO RELATED APPLICATION

This is a continuation application of application Ser. No. 07/848,218, filed Mar. 10, 1992 now abandoned, which is, in turn, a divisional application of application Ser. No. 07/596,679 filed Oct. 12, 1990, now U.S. Pat. No. 5,096,729.

BACKGROUND OF THE INVENTION

The present invention relates to an apparatus and process for blanching pastas.

In the aqueous blanching of pasta strands, it is usually necessary to transport the pasta strands on conveyor belts in a long flat unit about 25 meters long which takes up a great deal of space.

In the commercial cooking of fresh pasta products, there is often used a conveyor system which carries the pasta product through a tank of hot water along a submerged horizontal zigzag travel path. For example, U.S. Pat. No. 2,905,105 describes a stack of closely spaced, parallel conveyors wherein the top run of the endless belts of adjacent conveyors travel in opposite directions. Another type of conveyor system comprises a pair of continuous belts which are held with a uniform spacing between them during their horizontal zigzag travel through the hot water and such systems are described in U.S. Pat. No. 4,522,217 and U.S. Pat. No. 4,752,491. However, conveyor belts are expensive. They also easily become worn or broken especially when travelling through hot water, leading to costly breakdowns.

In addition, when blanching using the conveyor systems described in U.S. Pat. No. 4,522,217 and U.S. Pat. No. 4,752,491 where the pasta strand is horizontally conveyed through the blanching tank between two parallel zigzag containers, there are practical difficulties because the pasta strand absorbs water and thus gradually expands both in width and in length which means that the speed of the strand at the outfeed end of the tank should be higher than at the infeed end. However, this is impossible to attain since it is the same endless conveyors which enter and leave the tank.

SUMMARY OF THE INVENTION

The present invention provides a tank apparatus which is useful particularly for blanching or cooking pasta strands without using conveyor belts in the tank which can. enable the space required in the factory to be reduced by from 8- to 10-fold.

In the context of the invention, as described below and as may be seen from the drawing Figures, the apparatus comprises a tank, a plurality of rollers having a size which enables the rollers to be positioned within the tank, and guides associated with the rollers for positioning the rollers within the tank so that the rollers have longitudinal axes parallel one to another and for enabling raising and lowering the rollers so that adjacently positioned rollers may be vertically* positioned at a position one above the other. Rollers which are referred to below as "substantially stationary" rollers provide for a certain amount of vertical movement which, such as in the case of blanching or cooking pasta, assist in minimizing risk of breakage of the pasta during its travel through the tank, while the rollers referred to as "movable" rollers adjust the length of travel of the pasta through the tank.

Accordingly, the present invention provides an apparatus comprising a tank having positioned therein at least one substantially stationary roller and at least one movable roller capable of reciprocating vertically from a position above to a position below the substantially stationary roller.

Preferably there are more than one substantially stationary and movable rollers positioned alternately, all the movable rollers being adapted to ascend or descend simultaneously. In operation, for such as blanching or cooking pasta, a pasta is transported to, through and out the tank within which it is passed beneath and above vertically movable rollers positioned in the tank so that the pasta travels through the tank in a vertically oriented zigzag course about the rollers while being blanched or cooked by the water contained in the tank, and then the blanched or cooked pasta is transported out of the tank. The pasta is passed beneath at least one vertically movable roller and above at least one substantially stationary roller whereupon the movable roller moves downwards to a position below the substantially stationary roller causing the pasta strand to travel in the vertical zigzag course through the water. It travels upwards and downwards and around the rollers, and the travel motion is caused by a pull on the strand when it contacts a conveyor beyond the outlet of the tank. Owing to the vertical travel of the pasta through the water in the tank, the weight of the pasta is balanced, around the rollers in such a way that the pasta seems almost weightless, and therefore, only a small friction caused by the rollers has to be overcome to cause the travel motion. The pasta travels freely in the vertical zigzag course through the tank and it is free to expand by absorbing water without any complications.

DETAILED DESCRIPTION OF THE INVENTION

In the apparatus of the present invention, the walls of the tank are conveniently provided with guiding means which are adapted to guide the shafts of the movable rollers as they reciprocate. Means may be provided to adjust the lower end position of the movable rollers to desired blanching or cooking time requirements e.g., raising the lower position of the movable rollers results in a shorter course through the tank to give a shorter blanching time.

In one advantageous embodiment, to ensure an optimal stretching of the pasta strand in order to minimize the risk of breakage during its travel through the tank, a control system is incorporated which comprises the substantially stationary rollers having a density less than the density of water, referred to hereinafter as a density less than 1.0, which are guided, for instance, by having their shafts positioned in vertical grooves to allow a certain small amount of movement upwards and downwards, and at least one sensor device adapted to automatically adjust the speed of the pasta strand depending on the position of the roller. The speed of the pasta strand is conveniently adjusted by controlling the speed of the pasta extruder. The control system may be digital or analog. For example, in a digital control system an inductive sensor detects the position of the roller, conveniently by being positioned in at least one of the vertical grooves guiding the shafts whereas in an analog control system an analog sensor measures the rotation of a wheel which is connected to a roller by means of a taut wire.

The blanching tank is conveniently provided with inlet and outlet means for the pasta strands in the side walls, preferably at a position between the stationary rolls and the movable rolls when in their upper position. Conveyor belts may suitably be provided to transport the pasta strands to the blanching tank from a pasta extruder and away from the blanching tank.

The approximate blanching or cooking time is from 1 to 20 minutes and the temperature may range from 70° C. to 100° C.

BRIEF DESCRIPTION OF THE DRAWINGS

The present invention is illustrated by way of example only with reference to the accompanying drawings.

DETAILED DESCRIPTION OF THE DRAWINGS

Figure 3:
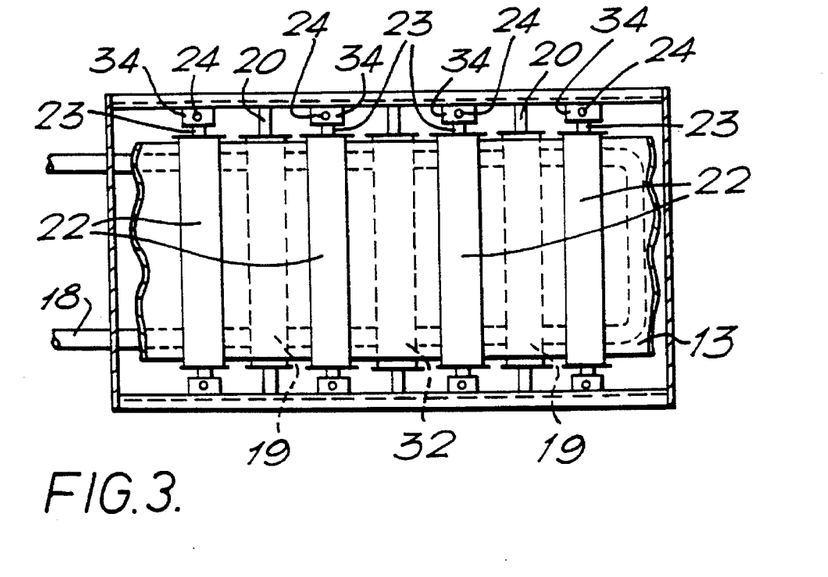
FIG. 3 is a top view of FIG. 2 looking in the direction of the arrows I—I.
Figure 4:
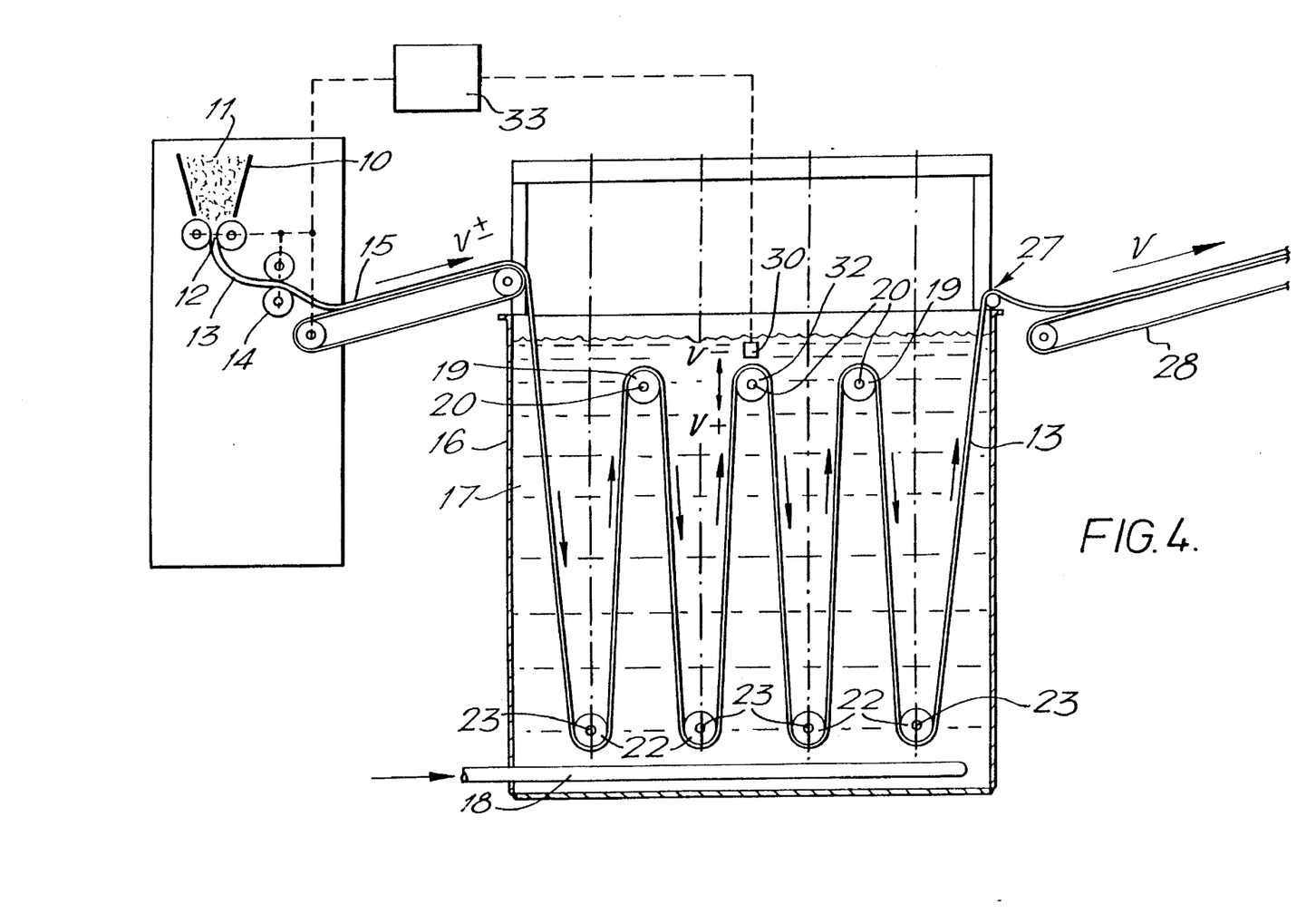
FIG. 4 is a side sectional view of a blanching system according to the invention showing a control mechanism.
Figure 5:
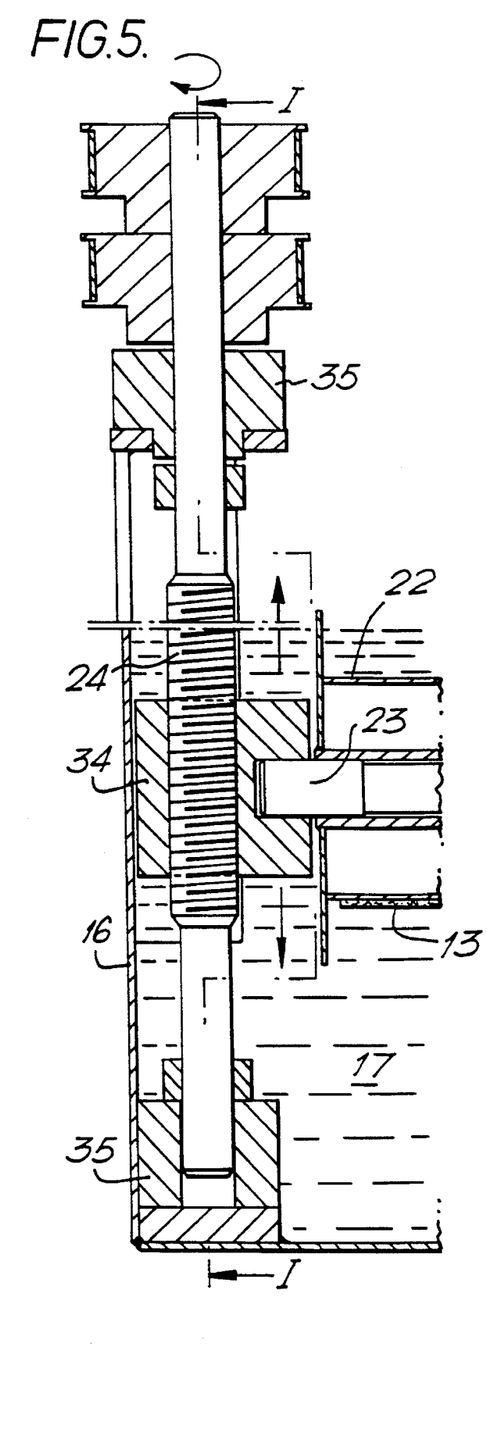
FIG. 5 is a sectional view through one of the walls of the blancher showing a guiding means for the movable rollers.
Figure 6:
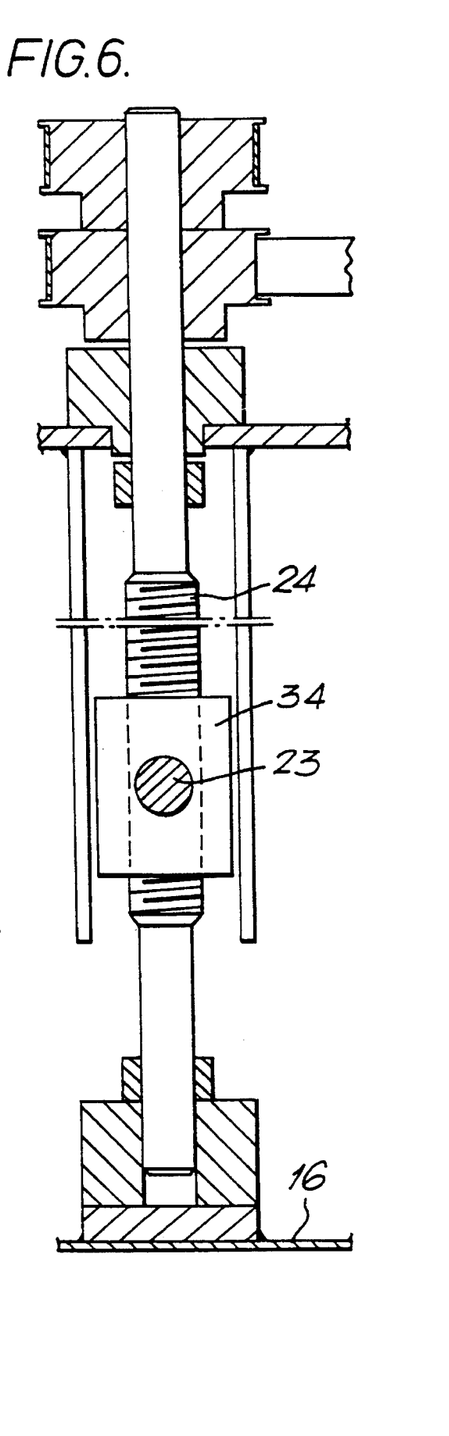
FIG. 6 is a view of FIG. 5 along the line I—I looking in the direction of the arrows.

Referring to the drawings, the blanching system comprises a kneader/sheeter 10 containing the dough 11 an extruder 12 from which is extruded a pasta strand 13, as shown in FIG. 3 in a form of a sheet rollers 14, an inlet conveyor belt 15, a blanching tank 16 containing water 17, a steam coil 18, substantially stationary rollers 19,32 with shafts 20 capable of sliding in vertical grooves 21 (FIG. 8), movable rollers 22 with shafts 23 fixed in threaded nuts 34 capable of reciprocating along threaded spindles 24 (FIGS. 5 and 6) fixed to the wall of the tank by bearings 35 and which are rotated by an electric motor 25. The blanching tank 16 is provided with an inlet 26 and an outlet 27 and beyond the outlet is an outlet conveyor 28.

Figures 7, 8:
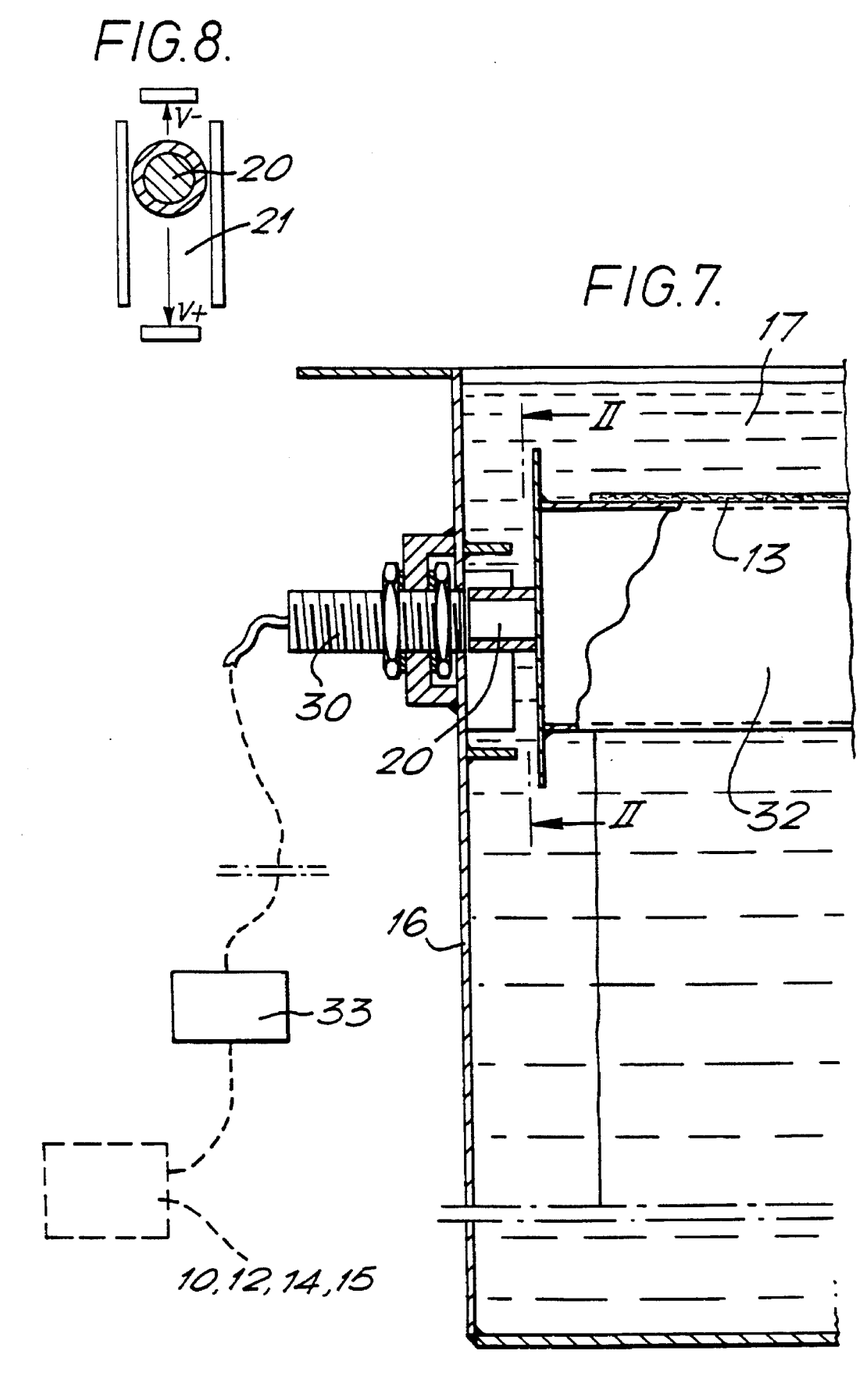
FIG. 7 is a sectional view through a wall of the blancher showing detail of a control system.
FIG. 8 is a view of FIG. 7 along the line II—II looking in the direction of the arrows.
Figure 9:
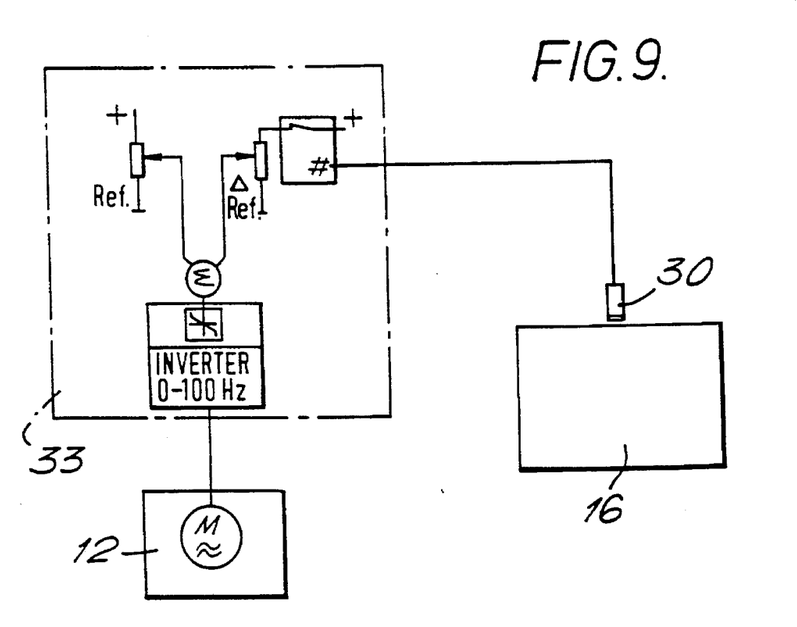
FIG. 9 is a schematic view of the control system.
Figures 10, 11:
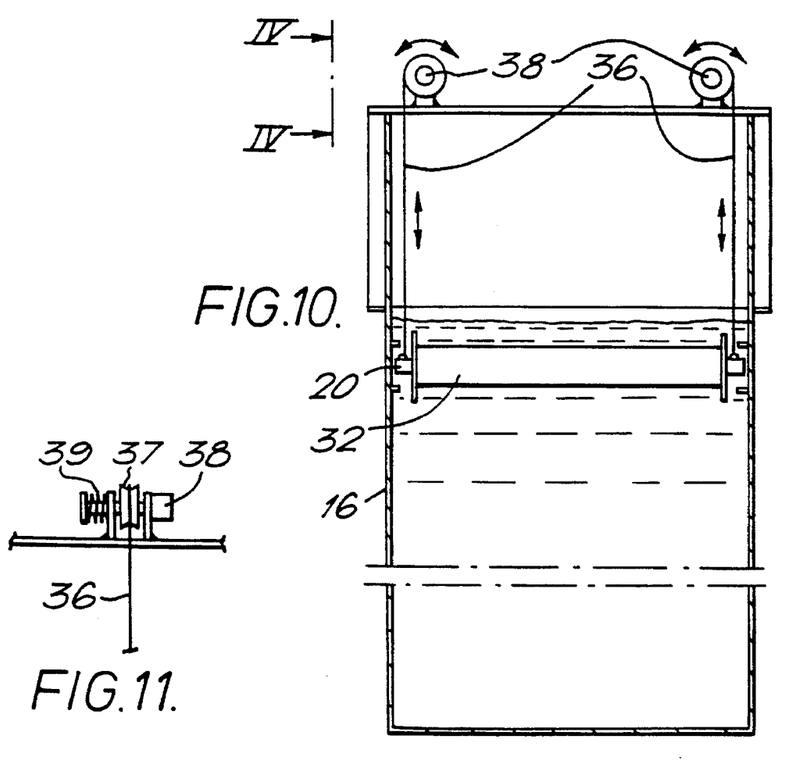
FIG. 10 is a sectional view of FIG. 1 along the line III—III looking in the direction of the arrows to show an alternative control mechanism.
FIG. 11 is a sectional view along the line IV—IV of FIG. 10 looking in the direction of the arrows.
Figure 12:
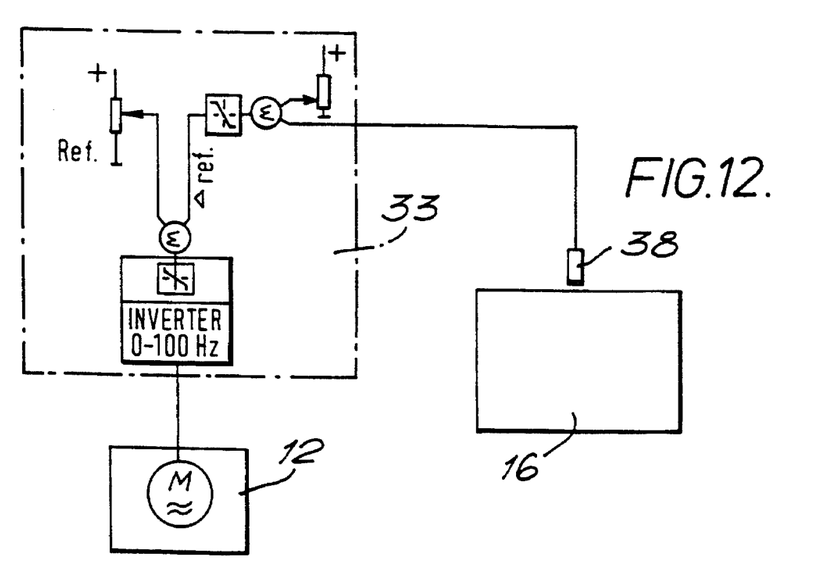
FIG. 12 is a schematic view of the alternative control system shown in FIGS. 10 and 11.

In FIGS. 7,8 and 9 there is shown an inductive sensor 30 in the vertical groove 21 close to the end of the shaft 20 of a stationary roller 32, with a speed regulator 33 for adjusting the speed of the extruder 12. In FIGS. 10,11 and 12, there is shown a wire 36 connecting the shaft 20 of roller 32 to a wheel 37 attached to an analogous sensor 38 with a torsion spring 39 to taut the wire 36.

Figure 1:
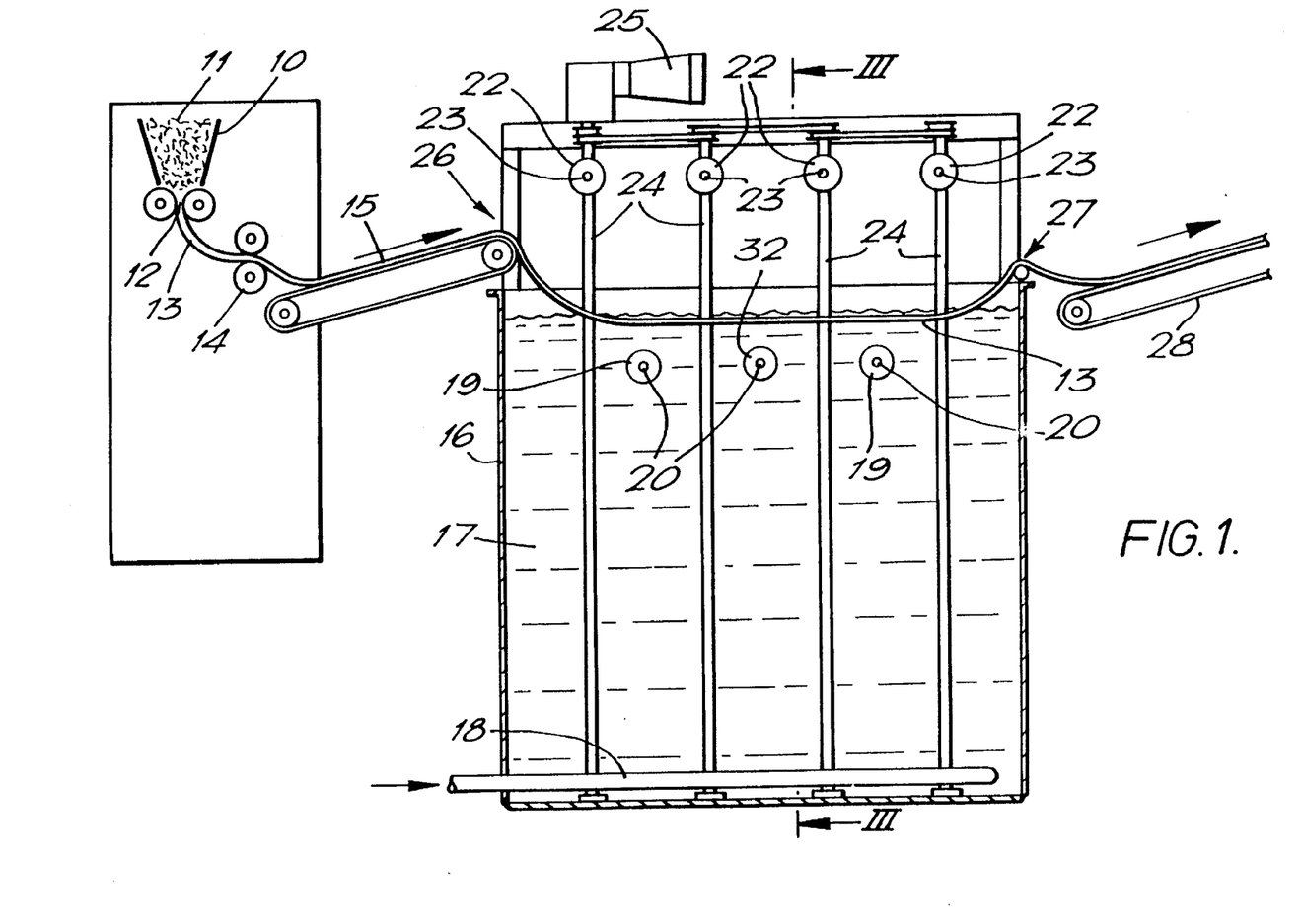
FIG. 1 is a side sectional view of a blanching system according to the invention at the start with the movable rollers in their upper position.
Figure 2:
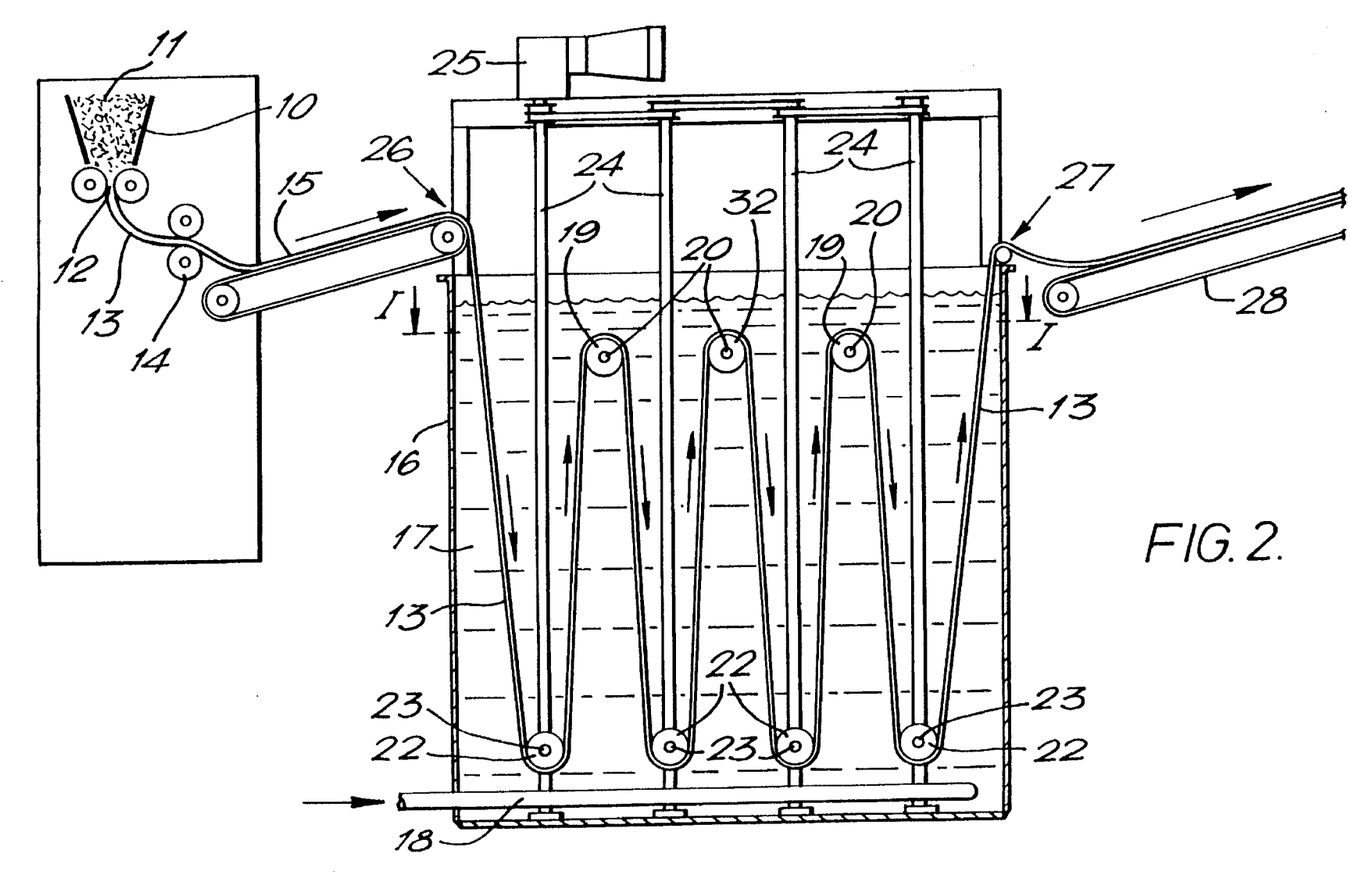
FIG. 2 is a side sectional view of a blanching system according to the invention in operation with the movable rollers in their lower position.

At the start of the operation the movable rollers 22 in the blanching tank are in their upper position as shown in FIG. 1, and the pasta strand 13, which as shown in FIG. 3 may be in a form of a sheet extruded through the extruder 12 from the dough 11 in the kneader/sheeter 10, is guided along the inlet conveyor 15 through the inlet 26 above the water surface in the blanching tank through the outlet 27 and placed on the outlet conveyor 28 which is stationary. The electric motor 25 is then switched on to rotate the threaded spindles 24 which lower the movable rollers 22, by means of the shafts 23 fixed in the threaded nuts 34 which travel along the threaded spindles slowly into the blanching tank so that they guide the pasta strand 13, which as shown in FIG. 3 is in a form of a sheet, down into the water to travel in a vertical zigzag course underneath the movable rollers and over the stationary rollers. When the movable rollers have reached their lower position as shown in FIG. 2, the outlet conveyor is started at the desired running speed (v). If a shorter blanching time is required, it is possible to raise the movable rollers from their lower position shown in FIG. 2 to any desired position, which results in a shorter course of the pasta strand through the blanching tank. Thus, as illustrated, the pasta to be blanched or cooked is transported to and through a tank containing water to blanch or cook the pasta, and while the pasta is transported through the tank, it is passed around and in contact with vertically movable rollers positioned in the tank so that the pasta extends freely and vertically between the rollers and travels in a vertically oriented zigzag course around the rollers and through the water in the tank for being blanched or cooked, and then the blanched or cooked pasta is transported out of the tank.

To ensure an optimal stretching of the pasta strand, thus minimizing the risk for breakage during its travel through the blanching tank, a control system comprising an induction sensor 30 is shown in FIGS. 4, 7, 8, and 9, and a control system comprising an analogous sensor 38 is shown in FIGS. 10,11 and 12 where the substantially stationary rollers 19,32 are designed to have a density below 1.0, resulting in a tendency of rising in the water-filled blanching tank. The roller shafts 20 are guided in vertical grooves 21 which allow a certain movement upwards and downwards. In the embodiments illustrated, roller 32 is designed to have a slightly higher density than the other rollers 19 so that if the pasta strand becomes stretched, roller 32 will descend before rollers 19. Rollers 19 function as an extra safety device to prevent the pasta strand from breaking at extremely fast tension. In the embodiments illustrated in FIGS. 4,7,8 and 9, the indication roller 32 when in its upper position actuates the sensor 30 which gives a signal to the speed regulator 33 to control the speed of the extruder 12.

During its zigzag course through the blanching tank, the pasta strand 13 travels above the rollers 19 and the indication roller 32, and when the outlet conveyor 28 pulls the pasta strand too much, the indication roller, which is floating in the water will be pressed downwards before the rollers 19 because of its higher density and will descend until reaching a certain level at which it ceases actuating sensor 30. This sensor then interrupts its signal to the speed regulator (33) of the kneader/ sheeter, extruder and inlet conveyor 15, which increase their speed, until having reached a pre-determined speed higher than the speed of the outlet conveyor 28, and the tension of the pasta strand is released.

As the speed of the inlet conveyor 15 now is higher than the speed of the outlet conveyor 28, there will soon be too much pasta fed into the blanching tank, which makes the pasta strand slacken. The indication roller 32 will then ascend to a higher level, thereby actuating sensor 30 again, and this in turn gives a signal to the speed regulator 33 to decrease the speed of the inlet conveyor to a lower, pre-determined speed. The indication roller 32, which is floating in the water, will thus be oscillating around the level "sensor actuated/not actuated". The duration of the oscillation is dependent on the inertia of the speed regulator of the extruder/inlet conveyor and on how far the indication roller ascends in the water.

As indicated in FIG. 8, when the shaft 20 of the roller 32 is in the upper position in groove 21, the speed $V^-$ is less than V, and when in the lower position, the speed $V^+$ is greater than V. The approximate distance of the movement of the indication roller 32 in the groove 21 is 40 mm but, during operation, the distance will usually be within 10 mm.

In the embodiment illustrated in FIGS. 10,11 and 12, when the indication roller 32 ascends or descends, the taut wire 36 attached to the shaft 20 rotates the wheel 37 clockwise or anticlockwise thereby actuating the analog sensor 38 accordingly to control the speed of the extruder 12 by means of the speed regulator 33.

The system is thus based on a fixed speed, "v" of the outlet conveyor 28 placed beyond the blancher outlet 27. To get an optimal stretching of the pasta strand, its feeding speed is regulated by reducing or increasing the speed of the extruder by means of the indication roller 32 which is floating in the water. Also the substantially stationary rollers 19,32 have a smoothing effect on possibly occurring tensions in the pasta strand, as these are also floating in the water, thus being capable of moving a certain distance in a vertical direction.

I claim:

1. An apparatus comprising (i) a tank having a base and sidewall enclosure extending from the base suitable for containing water, (ii) at least one set of three rollers suitable for being positioned within the tank, wherein each roller extends longitudinally between roller ends and wherein one roller of each set has a density of less than a density of water so that the roller is floatable in water, and (iii) guides configured and positioned within the tank for guiding and positioning the rollers (a) so that, with respect to the tank being positioned so that the base extends horizontally and the sidewall extends vertically, the rollers of the set (1) have parallel longitudinal axes which extend horizontally and (2) are movable vertically and (b) so that, with respect to a horizontal plane, the floatable roller is positioned between and spaced at a distance from the two other rollers of the set and wherein:

the guides which guide and position the floatable roller are configured and positioned within the tank to control vertical movement of the floatable roller so that, upon the tank containing water, the floatable roller is positioned beneath a surface of the water; and the guides which guide and position the two other rollers of the set are configured and extend a distance for moving each such roller vertically to a position above and to a position below the position of the floatable roller.

2. An apparatus according to claim 1, wherein the guides for the floatable roller are configured to provide for vertical roller movement of up to 40 mm.

3. An apparatus according to claim 1 further comprising at least one sensor positioned to detect a vertical position of the floatable roller.

4. An apparatus according to claim 1 wherein there are a plurality of roller sets and wherein one of the floatable rollers has a density greater than the other floatable rollers and wherein one sensor is positioned to detect the position of the greater density floatable roller.

5. An apparatus according to claim 3, wherein the at least one sensor is an inductive sensor.

6. An apparatus according to claim 4, wherein the sensor is in inductive sensor.

7. An apparatus according to claim 4 wherein the floatable rollers have shafts and the guides provide grooves, and the shafts and the sensor are positioned in the grooves.

8. An apparatus according to claim 6 wherein the floatable rollers have shafts and the guides provide grooves, and the shafts and the sensor are positioned in the grooves.

9. An apparatus according to claim 1 further comprising means to control a lower vertical positioning of the two other rollers movable to a position above and a position below the floatable roller at a position below the floatable roller.

* * * * *